(12) United States Patent
Barbe et al.

(10) Patent No.: US 6,865,242 B2
(45) Date of Patent: Mar. 8, 2005

(54) METHOD AND DEVICE FOR RESTORING THE FALL-TIME OF AT LEAST ONE CONTROL CLUSTER FOR REGULATING REACTIVITY IN THE CORE OF A LIGHT-WATER-COOLED NUCLEAR REACTOR

(75) Inventors: Gérard Barbe, Rueil-Malmaison (FR); Alain Blocquel, Dardilly (FR); Dominique Hertz, Saint Foy les Lyon (FR); Gilles Morel, Saint Mard de Vaux (FR)

(73) Assignee: Framatome ANP, Courbevoie (FR)

( * ) Notice: Subject to any disclaimer, the term of this patent is extended or adjusted under 35 U.S.C. 154(b) by 0 days.

(21) Appl. No.: 10/480,466

(22) PCT Filed: May 31, 2002

(86) PCT No.: PCT/FR02/01853
§ 371 (c)(1),
(2), (4) Date: Dec. 12, 2003

(87) PCT Pub. No.: WO02/103707
PCT Pub. Date: Dec. 27, 2002

(65) Prior Publication Data
US 2004/0196945 A1 Oct. 7, 2004

(30) Foreign Application Priority Data
Jun. 14, 2001 (FR) .......................................... 01 07811

(51) Int. Cl.[7] .................................................. G21C 7/00
(52) U.S. Cl. ........................ 376/219; 376/260; 376/353
(58) Field of Search ................................ 376/219, 353, 376/224–225

(56) References Cited

U.S. PATENT DOCUMENTS

| | | | |
|---|---|---|---|
| 4,562,038 A | * | 12/1985 | Assedo et al. ............... 376/353 |
| 4,585,613 A | * | 4/1986 | Styskal et al. ............... 376/260 |
| 4,645,581 A | * | 2/1987 | Voggenthaler et al. ...... 204/275 |
| 5,098,647 A | * | 3/1992 | Hopkins et al. ............. 376/353 |
| 5,268,940 A | * | 12/1993 | Roseveare et al. .......... 376/249 |
| 5,434,895 A | * | 7/1995 | Domy et al. ................. 376/260 |
| 5,543,599 A | * | 8/1996 | Cole et al. ................. 219/69.2 |
| 5,897,793 A | * | 4/1999 | Chavez ....................... 219/69.2 |
| 6,266,386 B1 | * | 7/2001 | Patel et al. ................. 376/260 |

FOREIGN PATENT DOCUMENTS

| | | | |
|---|---|---|---|
| EP | 0081429 | 6/1983 | |
| EP | 0666447 | 8/1995 | |
| JP | 58223090 | * 12/1983 | ................. 376/353 |
| JP | 62083692 | 4/1987 | |
| JP | 63060874 | 11/1988 | |
| JP | 09206861 | 8/1997 | |

OTHER PUBLICATIONS

Database WPI, Week 198851, Derwent Publications, Class K05, AN 1988–366401, Article No. XP002190510, Nov. 25, 1988.

Database WPI, Week 198721, Derwent Publications, Class K05, AN 1987–146713, Article No. XP002190511, Apr. 17, 1987.

* cited by examiner

Primary Examiner—Harvey E. Behrend
(74) Attorney, Agent, or Firm—Connolly Bove Lodge & Hutz LLP

(57) ABSTRACT

After a nuclear reactor has been stopped and allowed to cool down following a period of operation, action is taken in a pool of the nuclear reactor on at least one guide tube of the activated upper internal equipment of the nuclear reactor to enlarge (21b, 21c) guide channels (16b, 16c) of the guide tube (8) in at least one continuous guidance zone. The enlargement is preferably performed by machining discontinuous cavities along the length of the guide channel (16b, 16c). Enlargement is preferably performed on the guide tube (8) in place within the upper internal equipment that has been placed on a storage stand in the reactor pool.

10 Claims, 11 Drawing Sheets

METHOD AND DEVICE FOR RESTORING THE FALL-TIME OF AT LEAST ONE CONTROL CLUSTER FOR REGULATING REACTIVITY IN THE CORE OF A LIGHT-WATER-COOLED NUCLEAR REACTOR

A FIELD OF THE INVENTION

The invention relates to a method and to apparatus for restoring the drop time of at least one control cluster for adjusting reactivity in the core of a nuclear reactor cooled by light water. In particular, the invention relates to a method and to apparatus for restoring the drop time of control clusters in a pressurized water nuclear reactor.

A BACKGROUND OF THE INVENTION

Pressurized water nuclear reactors have fuel assemblies in the form of juxtaposed prisms constituting the reactor core in which heat is given off by the fission of pellets of enriched uranium contained in the rods constituting said assemblies.

The nuclear reaction which delivers heat that is transmitted to a cooling fluid constituted by water under pressure is adjusted or stopped by means of control clusters, each constituted by a bundle of twenty-four absorber rods containing boron carbide which absorbs neutrons. The absorber rods of the control clusters are inserted in twenty-four guide tubes of a fuel assembly placed inside the array of fuel rods of the assembly, these guide tubes also constituting part of the framework of the assembly. This framework includes grids fixed to the guide tubes so as to define an array in which the fuel rods and the guide tubes are placed and held.

The control clusters are moved within the core of the reactor in a vertical direction, so as to adjust the nuclear reactor as a function of the depletion of the enriched uranium in the pellets contained in the fuel rods and as a function of variations in energy demand by the electricity network.

The control clusters are moved in the axial direction of the guide tubes of the fuel assemblies by control mechanisms placed on the closure head of the reactor containing the core.

Above the core, the control clusters are guided by guide tubes that form part of upper internal equipment of the reactor and that are disposed in alignment with the fuel assemblies into which the guide clusters are inserted.

The guide tubes of the upper internal equipment of the reactor include guide elements defining guide channels having vertical axes disposed in line with the vertical axes of the guide tubes of the fuel assemblies in which the absorber rods of a control cluster are moved. Each of the guide tubes is disposed vertically above a fuel assembly and serves to guide a control cluster which is inserted into the guide tubes of the fuel assembly.

In the bottom portion of the upper internal equipment of the reactor there is an upper plate of the core which is designed to rest in a horizontal position on the upper portions of the fuel assemblies of the core inside the reactor vessel.

Each of the guide tubes of the upper internal equipment includes guide elements having openings or channels which are in alignment in the axial travel direction of an absorber rod in line with the axis of a guide tube of a fuel assembly.

Some of these guide elements which are disposed in the upper portions of the guide tubes are constituted by guide cards pierced by through openings for passing the absorber rods of the control cluster. These elements are referred to as "discontinuous" guide elements. Other guide elements constitute "continuous" guide elements and they are disposed in the lower portion of the upper equipment, i.e. in that portion of the internal equipment that is adjacent to the upper plate of the core for coming to rest on the fuel assemblies of the core. These continuous guide elements are constituted by sleeves and by split tubes each serving to guide, respectively, two absorber rods or a single absorber rod.

The control cluster has a top portion in the form of a cross-piece to which the absorber rods are fixed via radially-extending arms which are caused to move axially inside the sleeves and the split tubes, these sleeves and split tubes being accessible from the central portion of the guide tube.

The control clusters are moved frequently, such that after an operating cycle, the cladding of the absorber rods in the control clusters can present a certain amount of wear. After being in operation for some length of time, the friction between the cladding of the absorber rods of the control clusters against the guide elements can lead to wear, and more particularly to ovalization of the bores of the guide elements which are interconnected by openings passing the radial arms of the spider assembly or "hub" to which the absorber rods are fixed. The wear phenomenon can be amplified under the effect of the cladding of the absorber rods vibrating inside the guide cards and inside the continuous guide elements, due to the passage of the cooling fluid, particularly during transients, thereby leading to premature wear of the guide elements.

In order to be able to reduce the reactivity of the core of a pressurized water nuclear reactor very quickly, for example in order to perform an emergency stop of the reactor, the control clusters are caused to drop into a fully-inserted position inside the fuel assemblies of the core by releasing the means that connect the control clusters so the displacement mechanisms. In order to guarantee safe operation of the nuclear reactor and a rapid stop of reaction within the core of the nuclear reactor, it is necessary to obtain a drop time for the control clusters that is as short as possible and to maintain this short drop time throughout long-duration operation of the nuclear reactor.

It has been found during operation of certain pressurized water power stations that the drop time of the control clusters can increase significantly, and in some cases reach values above the maximum acceptable threshold for drop time (e.g. for pressurized water nuclear reactors of the 900 electrical megawatt type, a limit time of 2.05 seconds prior to the rods entering a hydraulic damper situated at the bottom of the fuel assembly so as to damp and stop the cluster in the fully-inserted position). This fault is particularly marked for control clusters situated at the periphery of the nuclear reactor core in the vicinity of the cooling water outlet nozzles from the reactor vessel.

One of the possible causes of the drop time of the control clusters increasing while the nuclear reactor is in use is an effect whereby the absorber rods of the clusters are pressed hydraulically against the walls of the guide channels of the guide tubes by the flow of cooling water, this pressing effect increasing with increasing wear in the continuous guide channels of the guide tubes of the upper internal equipment. Wear of the continuous guide channels by the absorber rod clusters produces a kind of "running-in" effect so as to increase the effect of the absorber rods being pressed hydraulically against the guide tubes and it leads to an increase in friction, thereby slowing down the rods, which in turn leads to an increase in the cluster drop time.

With the nuclear reactors currently being manufactured, the guide tubes of the upper internal equipment are subjected in the factory to local enlargement of the continuous guide channels in a plurality of zones (e.g. three zones) along the length of each continuous guide channel. This local enlargement of the continuous guide channel in radial directions, which can be performed by hydraulic expansion, serves to reduce or eliminate the effect of the control clusters being pressed there against due to the wear of the channels while the nuclear reactor is in operation. This ensures that conditions relating to control cluster drop time are maintained throughout the time that the nuclear reactor is in operation.

For nuclear power stations that are already in operation, proposals have been made to replace the worn guide tubes of the upper internal equipment with new tubes, however the cost of such action and the difficulty of performing it, and also the difficulty of transporting, processing, and warehousing the activated guide tubes that have been replaced, make such a technique of replacing guide tubes unattractive for the operator of the nuclear power station.

A BRIEF DESCRIPTION OF THE INVENTION

The object of the invention is thus to provide a method of restoring the drop time of at least one control cluster for adjusting the reactivity in the core of a light water cooled nuclear reactor, in which the core is constituted by juxtaposed fuel assemblies placed in a nuclear reactor vessel with vertically disposed guide tubes for guiding absorber rods of control clusters, the reactor including upper internal equipment above the core and resting on the top portions of the fuel assemblies of the core via a top plate of the core extending in a horizontal disposition and including a set of vertical guide tubes each used for guiding a control cluster constituted by a bundle of mutually parallel absorber rods and including a plurality of mutually parallel guide channels for the absorber rods, which channels are situated in axial alignment with the guide tubes of a fuel assembly and comprise respective end portions adjacent to the upper plate of the core and implemented in the form of continuous guide channels, this method making it possible to obtain a control cluster drop time that complies with safety conditions for nuclear reactor operation even after the nuclear reactor has been in operation for a certain length of time leading to wear of the guide tube channels in the upper internal equipment, but without requiring the guide tubes to be replaced by new tubes.

To this end, in a pool of the nuclear reactor, after it has been stopped and cooled down after a period of operation, the guide channels of at least one guide tube of the activated upper internal equipment are subjected to enlargement, which is performed in at least one zone of the continuous guide channels.

In order to make the invention well understood, there follows a description, given with reference to the accompanying figures, both of the upper internal equipment in a pressurized water nuclear reactor, and of an implementation of the method of restoring the drop time of such upper internal equipment in accordance with the invention.

A BRIEF DESCRIPTION OF THE FIGURES

Figure 5:
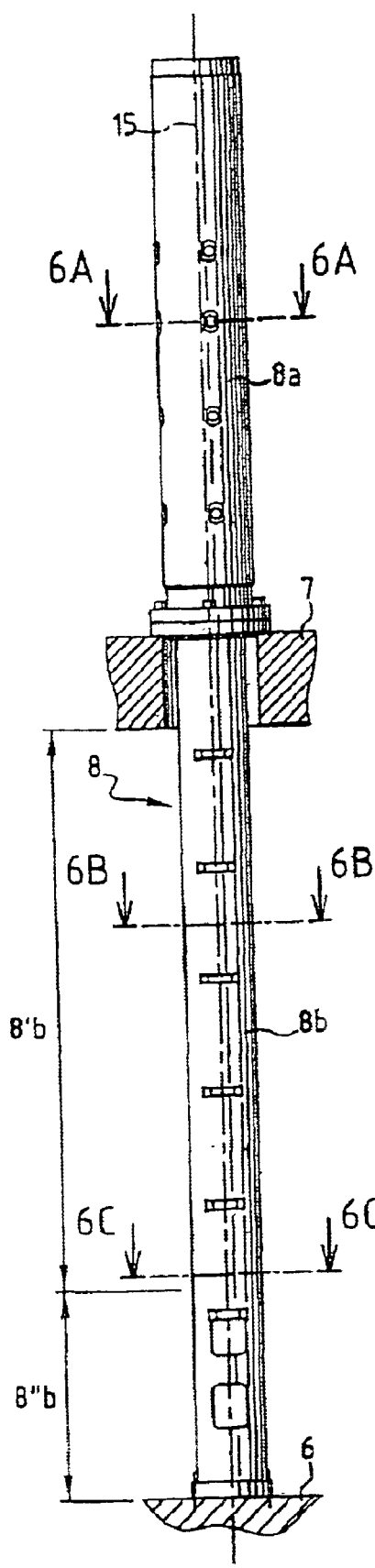
FIG. 5 is an elevation view of a guide tube of the upper internal equipment of a pressurized water nuclear reactor.
Figure 6A:
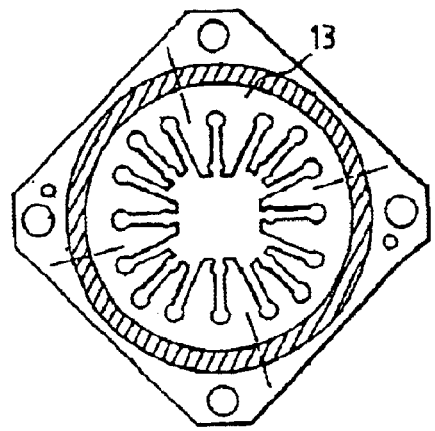
Figure 6B:
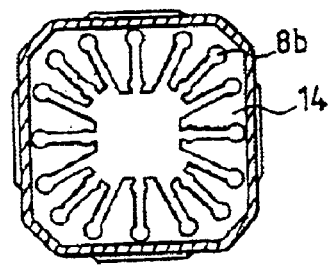
Figure 6C:
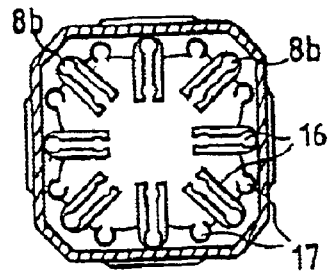

FIGS. 6A, 6B, and 6C are cross-section views of the guide tube shown in FIG. 5, respectively on A—A, B—B, and C—C of FIG. 5.

Figure 7:
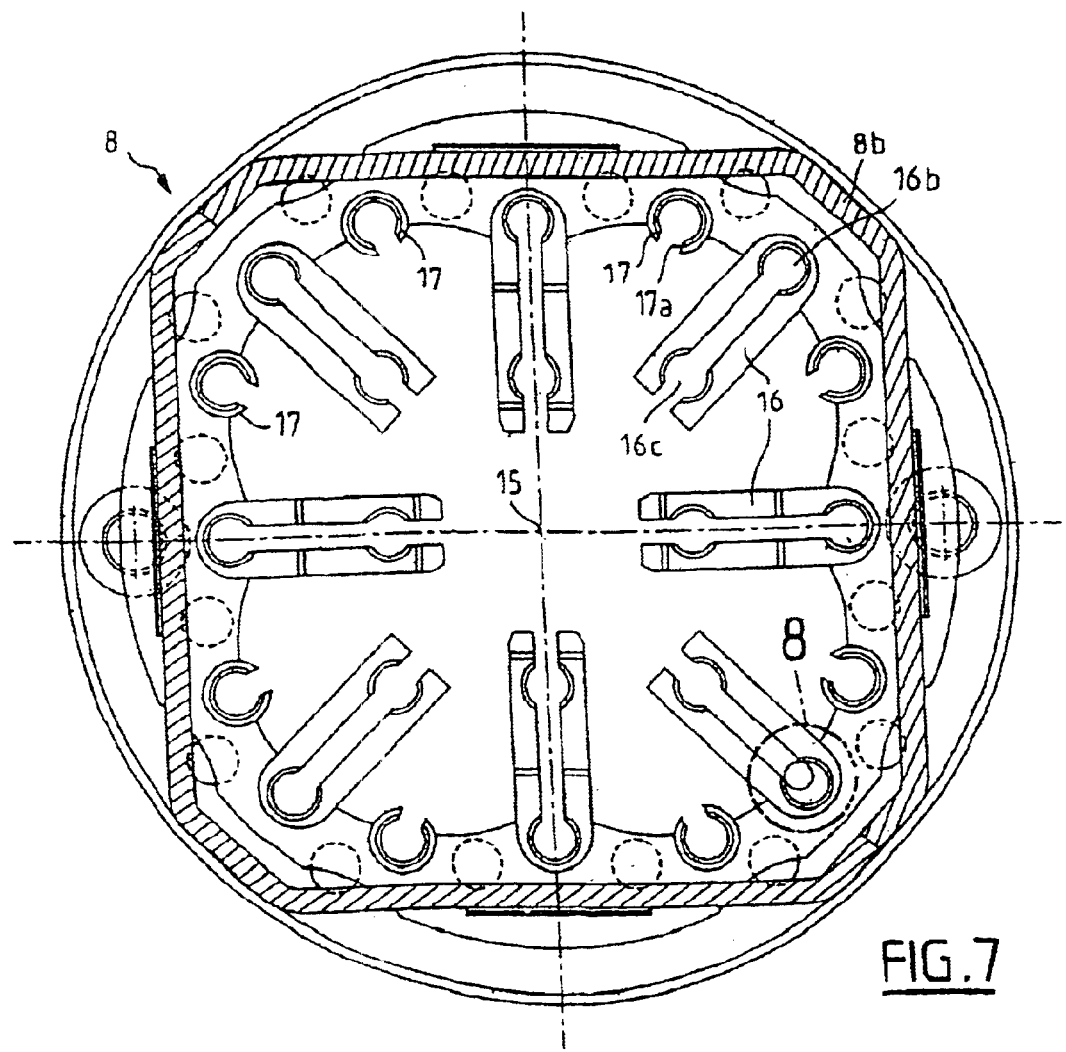

FIG. 7 is a cross-section view on a larger scale of the continuous guide elements of the guide tube as shown in FIG. 6C.

Figure 8:
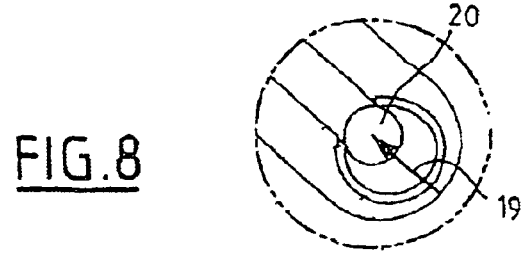

FIG. 8 is an enlarged view of detail 8 in FIG. 7, showing how an absorber rod is held down hydraulically in a continuous guide channel.

Figure 9:
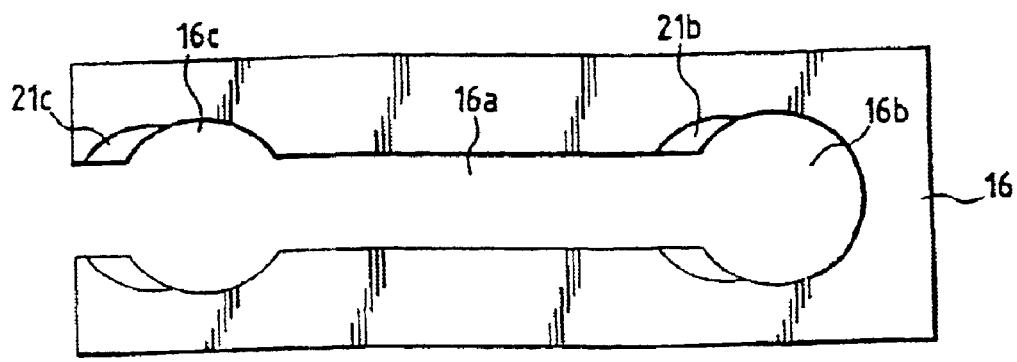

FIG. 9 is a cross-section view of a continuous guide sleeve of the guide tube, after a restoration method of the invention has been implemented on the continuous guide sleeve.

Figure 10:
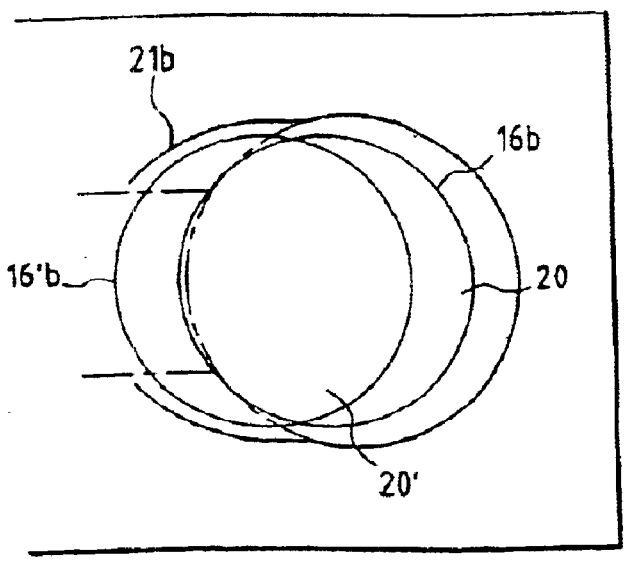

FIG. 10 is an axial section view on a larger scale of one of the guide channels of the continuous guide sleeve shown in FIG. 9.

Figure 11:
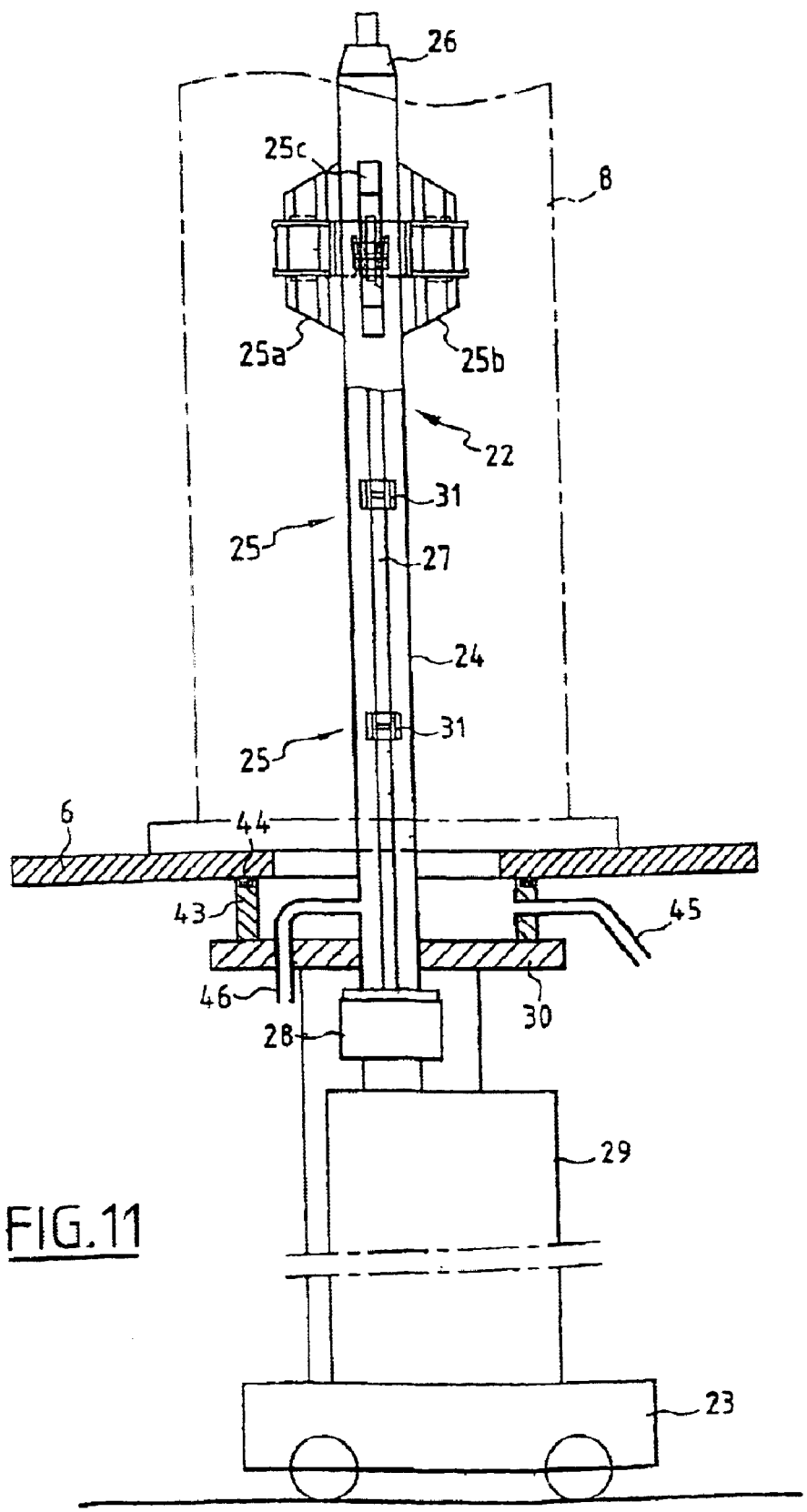

FIG. 11 is an elevation view of an electro-erosion machining apparatus used for implementing the method of the invention.

Figure 12:
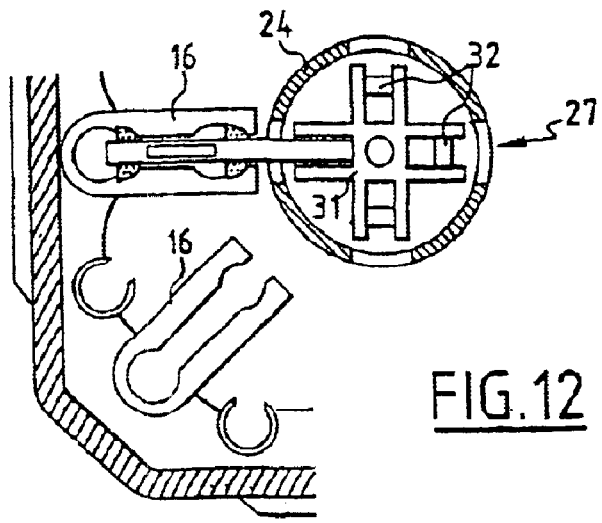

FIG. 12 is a cross-section view of a portion of the tooling shown in FIG. 11, in position in a guide tube of the upper internal equipment.

Figure 13:
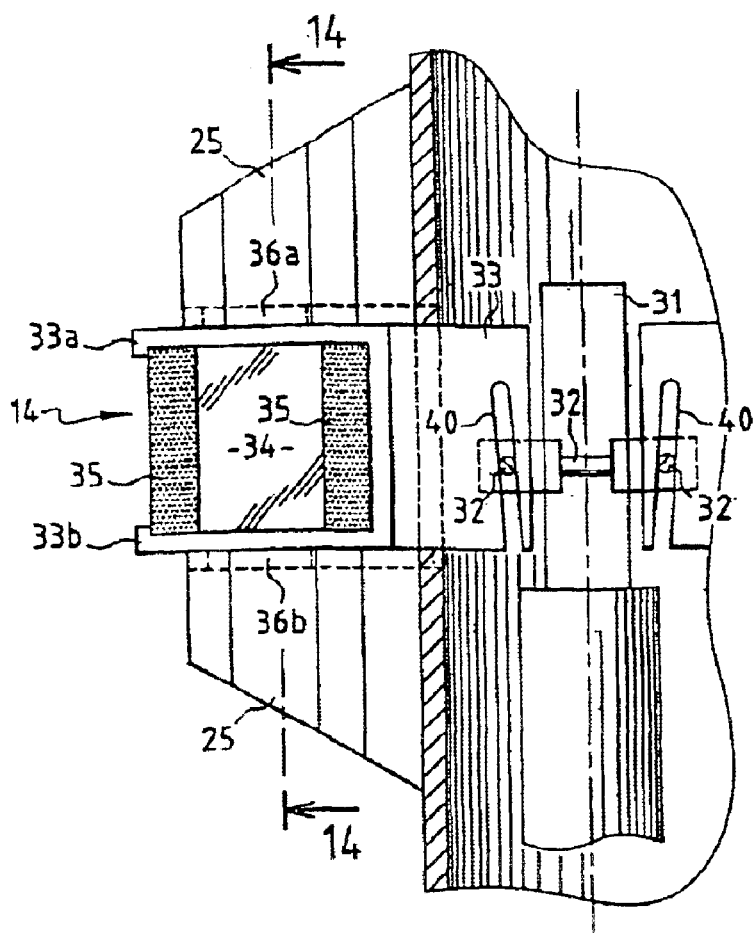

FIG. 13 is a side elevation view of a portion of the apparatus shown in FIG. 11.

Figure 14:
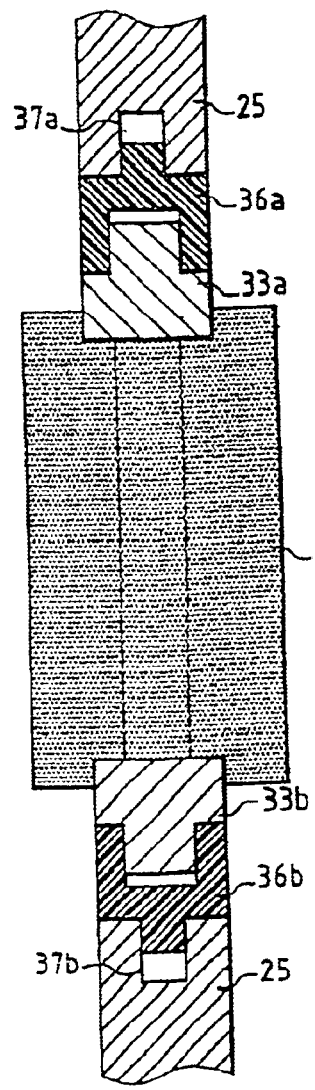

FIG. 14 is a section view on 14—14 of FIG. 13.

Figure 15:
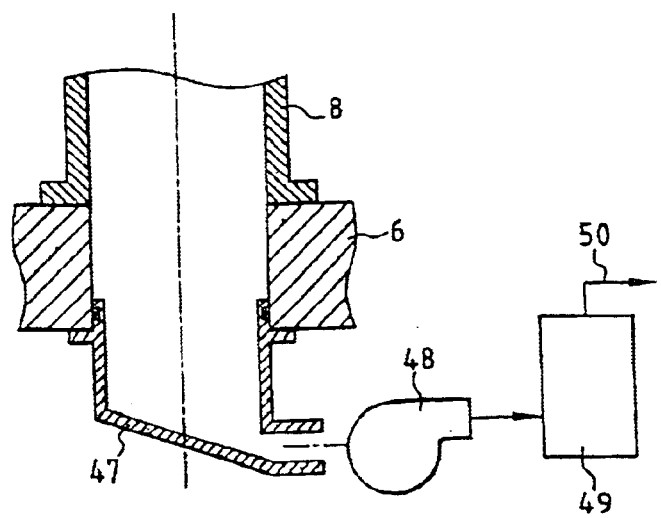

FIG. 15 is an elevation view and vertical section through a variant embodiment of a portion of the apparatus shown in FIG. 11.

Figure 16:
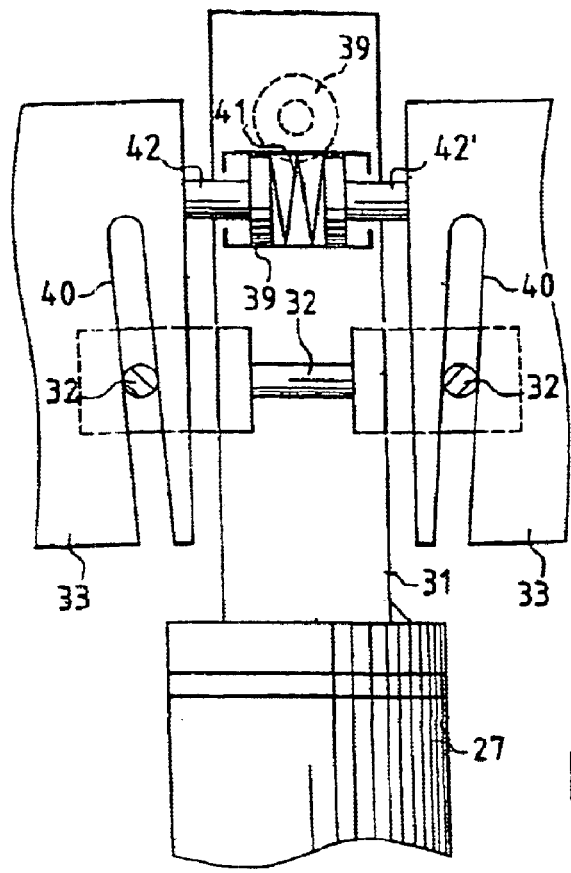

FIG. 16 is an elevation and section view of a detail of the apparatus shown in FIG. 11, showing the means for advancing the electro-erosion electrodes of the apparatus shown in FIG. 11.

Figure 17:
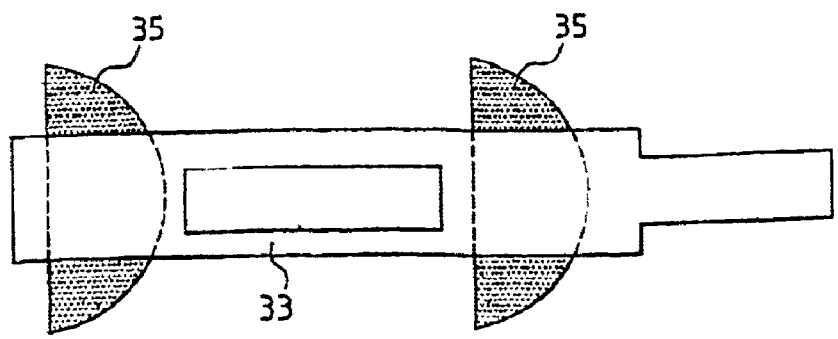

FIG. 17 is a view, partially in section, of an electrode for machining the guide channels of guide tubes by electro-erosion.

A DETAILED DESCRIPTION OF THE INVENTION

Figure 1:
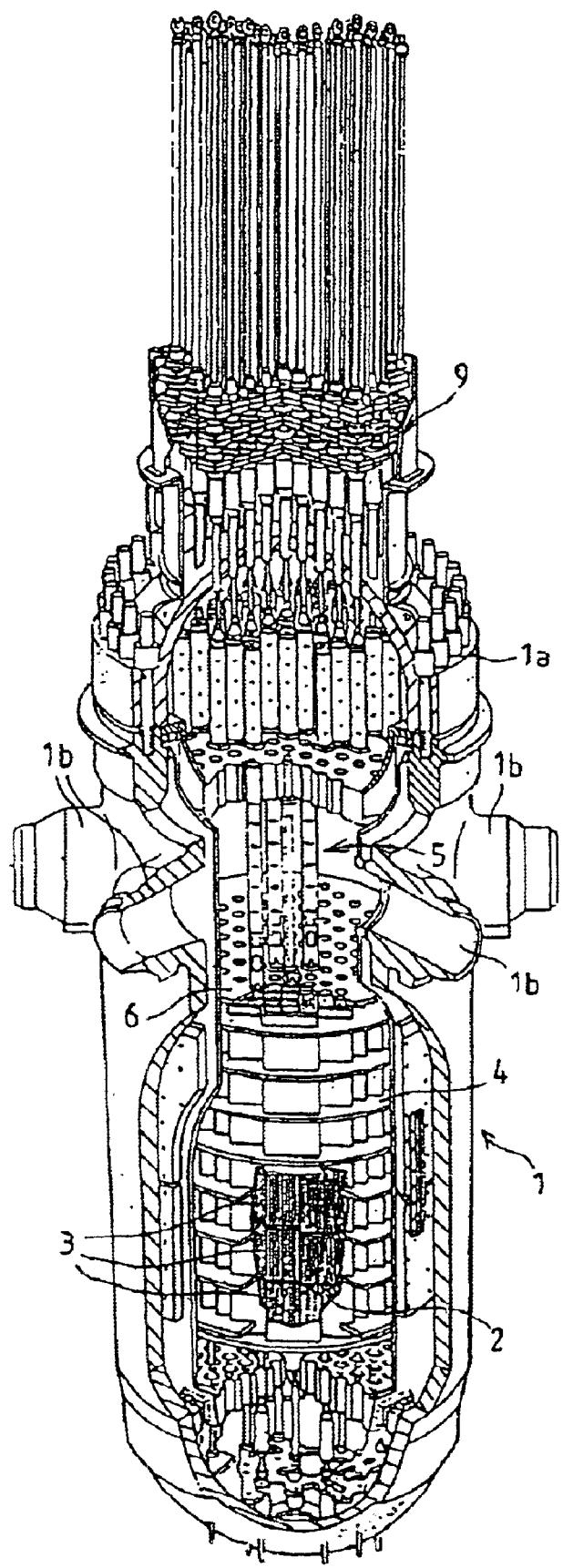
FIG. 1 is a cut-away perspective view of the vessel of a pressurized water nuclear reactor.

FIG. 1 shows the vessel of a pressurized water nuclear reactor given overall reference 1.

Inside the vessel 1 of the nuclear reactor there is located the core 2 constituted by fuel assemblies 3 of right prismatic shapes placed in juxtaposed manner so that the longitudinal axis of each fuel assembly is vertical.

The reactor core 2 is placed inside lower internal equipment of the nuclear reactor including in particular the baffle assembly 4 of the core; the upper internal equipment 5 is supported by the upper portion of the core assemblies via an upper core plate 6.

Figure 2:
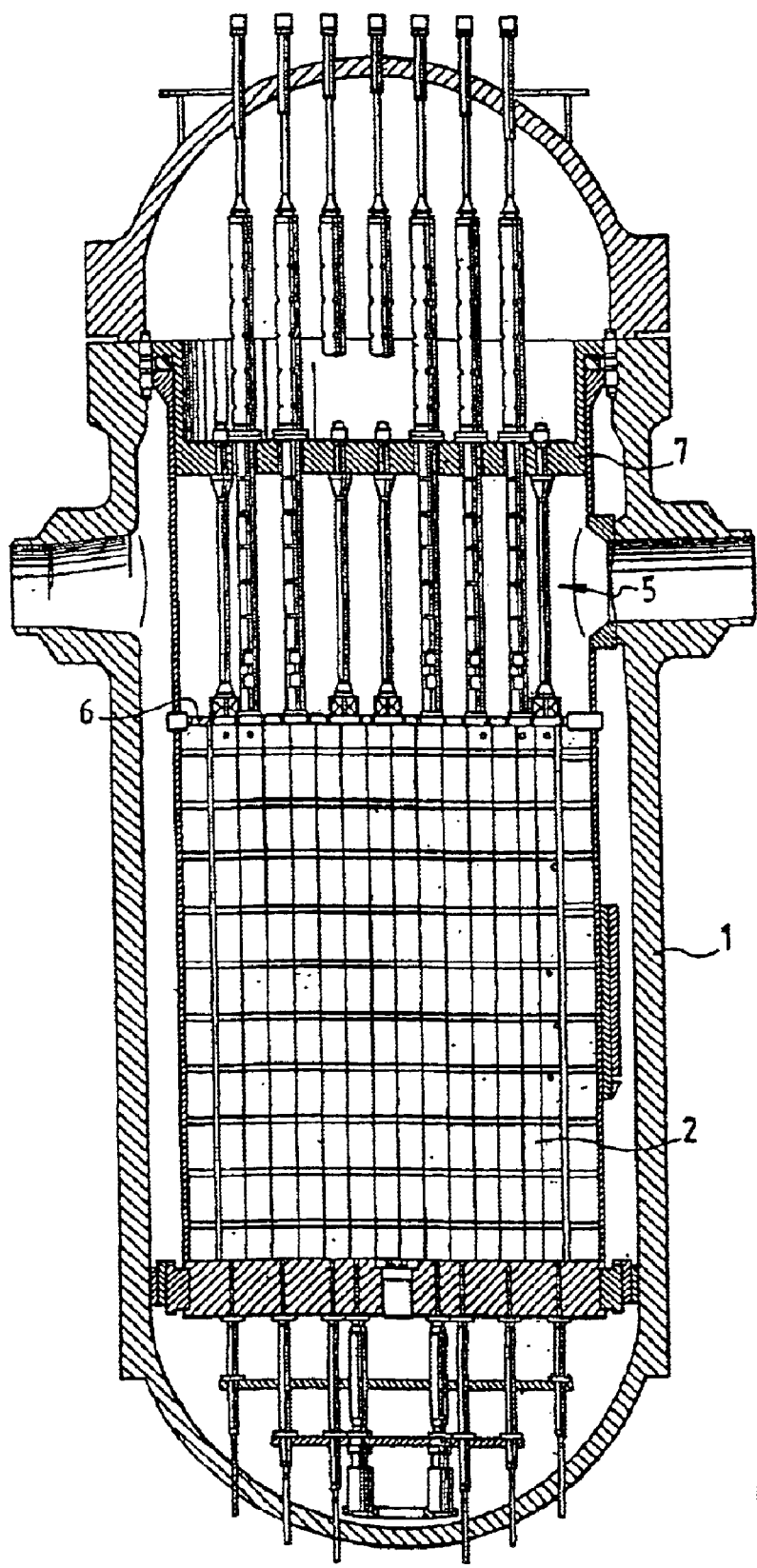
FIG. 2 is a section view on a vertical plane of symmetry through the vessel of a pressurized water nuclear reactor.
Figure 3:
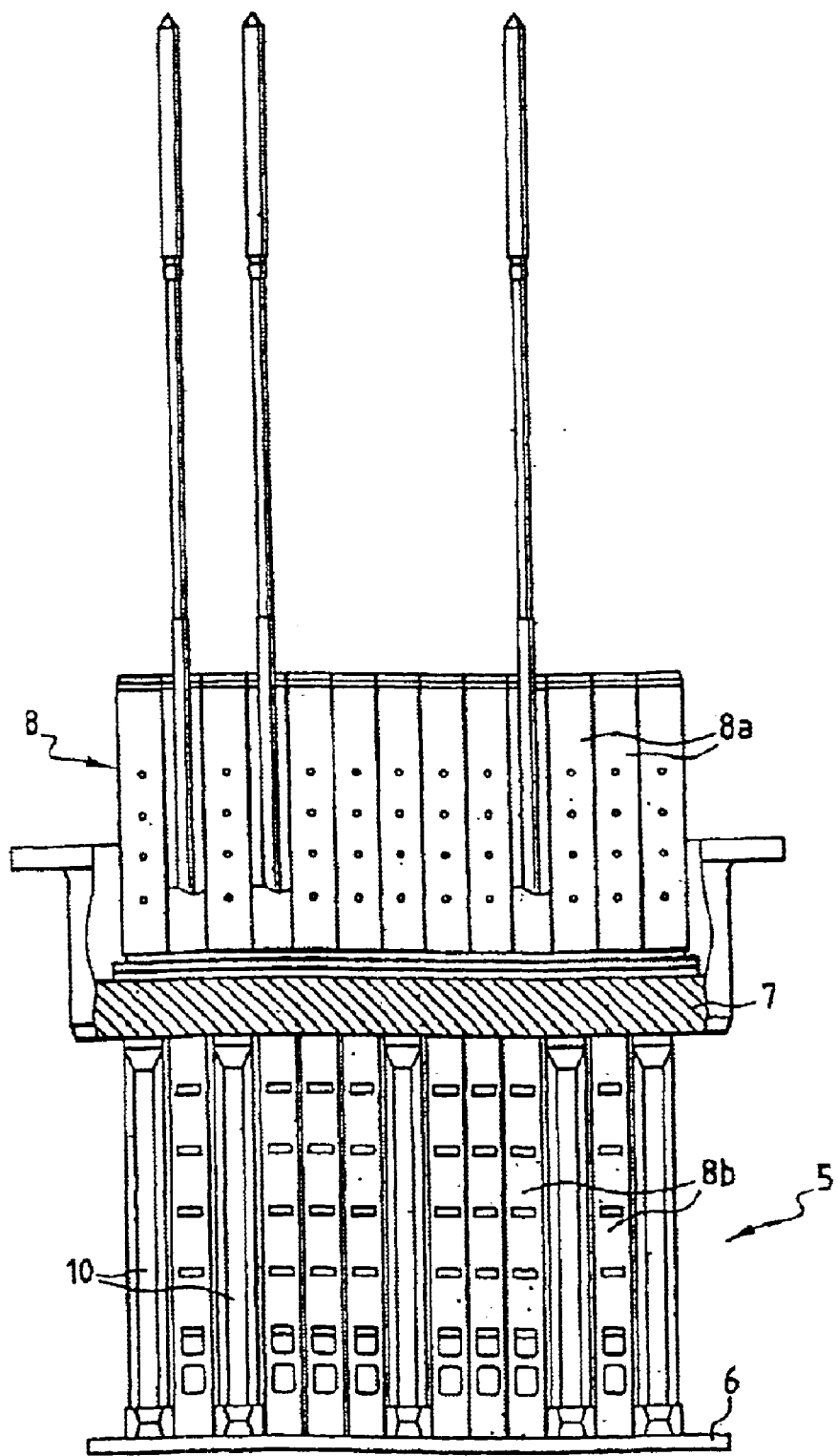
FIG. 3 is an elevation view of the upper internal equipment of a pressurized water nuclear reactor.

As can be seen in FIG. 1 and also in FIGS. 2 and 3, the upper internal equipment 5 also comprises an upper plate 7 parallel to the upper core plate 6 which constitutes the bottom portion of the upper internal equipment. The upper plate 7 is implemented in such a manner as to fix the upper internal equipment inside the vessel in which there is also suspended a barrel containing the baffle assembly 4 and the core 2 of the reactor, with the lower support plate for core assemblies being fixed to the bottom end thereof.

Above the upper plate 7 of the upper internal equipment, the upper internal equipment 5 comprises upper guide tubes 8a of circular section and, between the upper plate 7 of the upper internal equipment 5 and the upper plate 6 of the core, segments 8b of guide tube of substantially square section with rounded corners.

Each of the guide tube segments 8b is placed in axial alignment with a guide tube 8a, the upper tube 8a and the corresponding tube segment 8b together constituting a guide tube 8 of the upper internal equipment enabling a cluster for adjusting reactivity in the core of the nuclear reactor to be moved in the vertical direction, said cluster being connected to a suspension and displacement rod and being displaced in the vertical direction by a mechanism 9 situated above the closure head 1a of the vessel 1 (see FIG. 1).

Between the upper plate 7 of the upper internal equipment 5 and the upper plate 6 of the core, there are placed not only the segments 8b of the guide tubes 8, but also spacer columns 10 serving to hold the upper plate 6 of the core and keep it apart from the upper plate 7 of the internal equipment.

Figure 4:
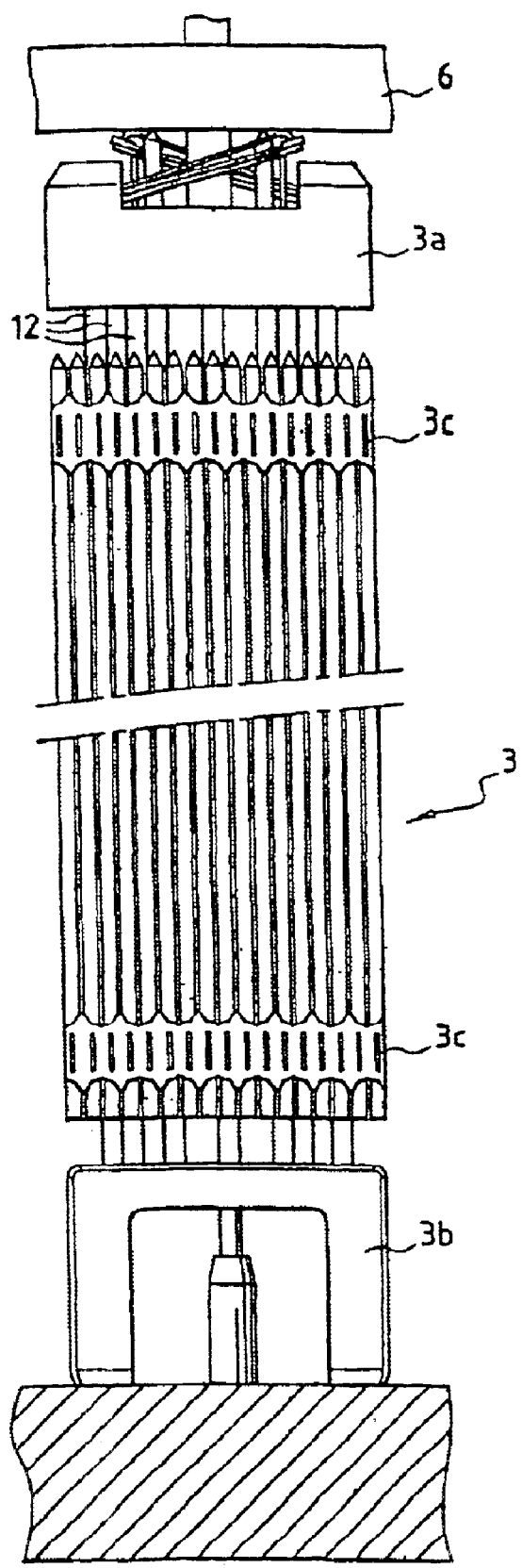
FIG. 4 is an elevation view, partially in section, of a fuel assembly for the core of a pressurized water nuclear reactor in its in-service position in the nuclear reactor vessel.

FIG. 4 shows a fuel assembly 3 in position inside the core 2 of the nuclear reactor, the fuel assembly 3 resting via a bottom nozzle 3b on the core support plate and including a top nozzle 3a against which the upper plate 6 of the core presses via blade springs.

The fuel assembly 3 comprises framework made up of spacer grids 3c distributed along the vertical axial direction of the fuel assembly and having cells through which the fuel rods of the assembly are inserted and in which they are held.

Some of the cells in the spacer grids 3c serve to pass and secure guide tubes 12 that are of a length greater than the length of the fuel rods, such that the guide tubes 12 of the fuel assembly present portions that project from the bottom and top portions of the bundle of rods in the fuel assembly which are fixed to the top and bottom nozzles 3a and 3b respectively.

The guide tubes may constitute both elements of the framework of the fuel assembly and elements for vertically guiding absorber rods of a cluster for adjusting the reactivity of the core of the nuclear reactor.

Some of the core assemblies are disposed in line with the guide tubes of the upper internal equipment so as to receive a control cluster constituted by a bundle of absorber rods in order to adjust the reactivity in the core of the nuclear reactor. The absorber rods are guided inside the fuel assembly by the guide tubes 12 each of which is designed to receive an absorber rod of a control cluster with a small amount of radial clearance.

Inside the guide tubes 8 of the upper internal equipment, the absorber rods of the control clusters are guided by guide elements in axial alignment with the guide tubes of the fuel assemblies that receive the control clusters.

FIG. 5 shows a guide tube 8 of the upper internal equipment 5 of the nuclear reactor.

The upper guide tube 8a disposed above the upper plate 7 of the upper internal equipment 5 contains discontinuous guide elements constituted by plates of circular section such as the plate 13 shown in FIG. 6A. Each of the discontinuous guide plates 13 for a cluster for adjusting the reactivity of the nuclear reactor comprises a central opening together with radial slots whose inner ends open out into the central opening of the guide card.

Each of the radial slots has a substantially circular opening at its outermost end, i.e. its end furthest from the central portion of the guide card in which the axis of the guide tube passes, said circular opening serving to guide an absorber rod of a guide cluster. Some of the radial slots, and more specifically every other slot also have, at their inner ends adjacent to the central opening of the guide card 13, respective second substantially circular guide zones for guiding respective absorber rods of the cluster for adjusting the reactivity of the core.

The guide card has twenty-four slots, each serving to guide an absorber rod disposed in such a manner as to be in axial alignment with the guide tubes of a fuel assembly. Each of the guide openings for an absorber rod communicates with the central cavity of the guide card 13 via a radial slot.

A cluster of absorber rods can thus be moved inside tubes 8a containing the discontinuous guide cards 13, said absorber rods being fixed at one end to a spider assembly or "hub" having radial arms to which the absorber rods of the control cluster are fixed. The hub of the control cluster and the absorber rods can move in the axial direction 15 of the guide tube 8 respectively inside the central opening and in the circular guide openings.

The guide tube segment 8b of substantially square section that is visible in FIGS. 6B and 6C, as placed between the upper plate of the internal equipment 7 and the upper plate of the core 6 has a top portion 8'b in which discontinuous guidance is provided for the control cluster, as in the tubes 8a, by means of guide cards 14 of the kind shown in FIG. 6B. Each guide card 14 has a central opening, radial slots, and circular openings for guiding absorber rods identical to those of the cards 13. Nevertheless, the outline of the discontinuous guide card 13 is no longer circular, but is substantially square so as to be suitable for matching the square inside section tube segment 8b.

The bottom portion 8"b of the segment 8b of the guide tube 8 constitutes a zone of the guide tube 8 in which continuous guidance is provided, having guide elements for the absorber rods of the guide cluster fixed therein that are constituted by continuous guide sleeves 16 and by split tubes 17. The sleeves 16 constitute guide channels for the absorber rods and these guide channels and the sections of the guide tube 17 are disposed in planes extending transversely to the guide tube in such a manner as to correspond to the guide openings for absorber rods in the guide cards 13 and 14 in the portion of the guide tube 8 that provides discontinuous guidance.

For guide tubes 8 used for guiding clusters for adjusting the reactivity of a pressurized water nuclear reactor of conventional type, the total length of the guide tube 8 is a little longer than 4 meters, and the length of the discontinuous guidance zone 8"b is about 1 meter.

FIG. 7 shows in greater detail the section of a continuous guidance portion of the guide tube 8 having continuous guide sleeves 16 and split tubes 17. Each of the continuous guide sleeves 16 has a central slot 16a and two guide channels for respective absorber rods of a cluster for adjusting reactivity, each in the form of a cylinder of circular section. The guide channels 16b and 16c of the sleeves 16 communicate via the slot 16a of the sleeve with the central empty space of the guide tube 8 in which the hub of the control cluster can be moved.

The split tubes 17 have respective slots 17a putting the insides of the guide tubes 17 into communication with the central empty space of the guide tube 8 in which the hub of the control cluster moves.

The guide sleeves 16 for providing continuous guidance are of two different types, the guide channels 16b and 16c of the sleeves of a first type being disposed at a radial distance from the axis 15 of the guide tube that is different from the radial distance between the axis 15 and the guide channels of the guide sleeves of the second type.

The guide tube 8 has eight guide sleeves whose sixteen guide channels have axes placed in fours on four coaxial cylindrical surfaces about the axis 5 of the guide tube.

The split tubes 17 present axes that are all situated on a common cylindrical surface having the axis 15 of the guide tube 8 as its axis.

As can be seen in FIG. 1, the nuclear reactor vessel 1 has feed nozzles 1b opening out to the inside of the vessel in the vicinity of the bottom portion of the upper internal equipment above the upper plate 6 of the core, i.e. in the discontinuous guidance zone 8"b of the guide tubes of the upper internal equipment 5.

Water for cooling the nuclear reactor and coming from various primary circuit loops penetrates into the vessel via the nozzles 1b so that the bottom portions of the guide tubes are subjected to a flow of cooling water flowing in a direction that is substantially radial relative to the guide tubes.

The portion of a cluster for adjusting the reactivity of the core and constituted by the absorber rods 20 inserted in the continuous guide elements of the guide tube as shown in FIG. 7 is subjected to a force in a radial direction tending to press the absorber rods 20 of the control cluster against a portion of the guide channel in which the absorber rod travels.

In FIG. 7 and in the detail of FIG. 8, there can be seen an absorber rod 20 subjected to a radial force 19 exerted by the cooling water of the nuclear reactor. The absorber rod 20 is urged towards the central portion of the upper internal equipment so the absorber rods come into contact with an inner portion of the surface of the corresponding guide channel.

While the nuclear reactor is in operation, the movement of the guide clusters in the axial direction of the guide tubes and the vibration of the absorber rods generated by the flow of cooling water in the vertical direction along the guide tubes gives rise to wear occurring in preferred manner on certain portions of the guide channels of the continuous guide elements, in particular for the guide tubes situated at the periphery of the core facing the feed nozzles 1b of the nuclear reactor vessel.

For a fraction of the continuous guide channels of the guide tubes, the preferential wear of the guide channels takes place towards the inside of the guide tube, i.e. towards the axis of the guide tube, while for other channels situated on the opposite side, preferential wear of the guide channel takes place towards the outside of the guide tube.

To ensure that the control clusters drop into the fully-inserted position in the core of the nuclear reactor, e.g. in the event of an emergency stop of the nuclear reactor, the control rod mechanisms 9 are commanded to release a rod to which the control cluster is fixed. The control clusters drop inside the guide tubes of the upper internal equipment and inside the fuel assemblies, under the effect of gravity.

While the control clusters are dropping, the absorber rods inside the discontinuous guides are pressed against the wear zones which match exactly the shape of the outside surfaces of the absorber rods given that the wear of the channels has had a "running-in" effect.

This results in an increase in contact area and in friction between the absorber rods and the surfaces of the continuous guide channels. The time taken for the control rod clusters to drop can thus be lengthened to such an extent as to exceed the maximum length of time required by safety conditions for nuclear reactor operation.

In order to restore the time taken by control clusters to drop, so as to comply with the safety conditions for nuclear reactor operation, it is possible to replace the peripheral guide tubes of the upper internal equipment with new guide tubes, however such an operation is extremely expensive.

The method of the invention consists in enlarging the continuous guide channel of the guide tubes that have become faulty in operation, in at least certain zones along the continuous guidance length (e.g. in three zones that are spread apart in the length direction of the continuous guidance). The guide channels can be enlarged by machining (e.g. machining by electro-erosion), or by forming (e.g. by hydraulic expansion).

In FIG. 9, there can be seen a continuous guide sleeve 16 whose guide channels 16b and 16c have been enlarged using the method of the invention so as to restore the time taken by a control rod to drop having two absorber rods traveling respectively in said channels 16b and 16c.

The method of the invention consists in making enlargements 21b and 21c along the sleeve 16 inside the guide channels 16b and 16c, the enlargements being constituted by cylindrical surface portions of axis that is offset relative to the original axis of the corresponding guide channel 16b or 16c.

The enlargements 21b and 21c may be made by machining by electro-erosion or by any other machining method that can be implemented in the guide tubes of the upper internal equipment of a nuclear reactor which can become highly activated after spending a certain length of time in an operating nuclear reactor.

The machining for enlarging the guide channels is generally performed on the upper internal equipment of the nuclear reactor after it has been extracted as a whole from the vessel, after the nuclear reactor has been stopped and has cooled down. The nuclear reactor pool is filled with water and after the closure head 1a of the vessel 1 has been opened, it is possible to release and extract the upper internal equipment under water within the reactor pool, in order to place it on a stand for examination and repair of the upper internal equipment within the reactor pool.

Generally, a carriage is used that moves along the bottom of the reactor pool, under the stand for the upper internal equipment, possibly stood on spacers so as to allow a machining tool to be placed inside the guide tubes of the upper internal equipment at different heights. Machining by electro-erosion can be performed under water in the pool, and as explained below, the machining debris is recovered at the bottom end of the guide tube so as to avoid contaminating the water of the reactor pool.

Typically, as shown in FIG. 9, a plurality of enlargements can be performed within the continuous guide channels of the upper internal equipment of a pressurized water nuclear reactor, said enlargements being in the form of cylindrical surfaces machined by electro-erosion such as the enlargements 21b and 21c having a radius of 5.5 millimeters (mm) and a center offset by about 3 mm from the original center of the corresponding guide channel 16b or 16c.

Along the continuous guide channels of length close to 1 meter, three re-machined zones are provided that are regularly spaced apart in the axial direction thereof.

FIG. 10 shows on a larger scale the enlargement 21b of the guide channel 16b situated at the outer end of the sleeve 16.

FIG. 10 shows the initial outline of the cross-section of the outer guide channel of the sleeve 16 against which the absorber rod 20 (shown in section) comes to bear, the drawing showing the circumstances of new internal equipment where the guide channels have not been subjected to any wear. The section of the absorber rod 20 presents a diameter that is slightly smaller than the initial diameter of the guide channel 16b and dashed lines show the section of the initial bearing surface in the new state.

For an absorber rod having a diameter of about 10 mm, the corresponding guide channel presents a diameter that is a little more than 11 mm. During operation of the nuclear reactor, for a guide channel in a guide tube sleeve for internal equipment situated towards the outside of the core facing a cooling water inlet of the reactor, the absorber rod 20 is pressed towards the inside of the guide channel 16b, as shown in FIG. 10, and gives rise to wear of the wall of the guide channel towards the inside of the guide tube. The absorber rod 20 occupies a position 20' that is offset inwards away from its initial position as determined by the guide channel 16b. Simultaneously, the wear surface which is analogous to "running-in" enables the absorber rod to be pressed better against the inside surface of the guide channel. The increase in contact area between the absorber rod and the guide channel leads to increased friction and thus, when the control rods are dropped, to an increase in the time taken by a control rod to drop when it has absorber rods such as the rods 20' in contact with the wear surface.

It is generally accepted that wear in the inwardly-directed diametrical direction must not exceed 2 mm.

Once this amount of wear has been reached, it is possible either to replace the guide tube having the guide channels which present maximum wear, or else to implement the method of the invention by performing machining 21b in the form of cylindrical portions towards the inside of the guide tube. For example, machining is performed in such a manner as to obtain two cylindrical surface portions enlarging the inside surface of the guide channel, of radius close to 5.5 mm. After machining has been performed in accordance with the invention, the absorber rod is no longer in contact with a wear surface that increases friction. The time taken by the control rod to drop is thus restored.

Restoration of the drop time of control clusters by the method of the invention can be implemented by performing machining of the guide channels of the guide tubes using tooling as shown in FIGS. 11 to 17.

FIG. 11 shows apparatus 22 enabling the method of the invention to be implemented by electro-erosion machining of the guide channels of guide tubes in upper internal equipment of a pressurized water nuclear reactor.

The apparatus 22 is used inside the reactor pool, under water, with the upper internal equipment (represented by the upper plate 6 of the core) resting on a maintenance stand in the bottom of the reactor pool.

Prior to implementing the method of the invention, after the nuclear reactor has been stopped and has cooled down, the closure head is removed from the reactor vessel and is placed on an examination and repair stand in the bottom of the reactor pool.

The upper internal equipment is removed therefrom and placed on the repair stand for upper internal equipment in the bottom of the pool, which stand may include raising means.

In this storage position, the upper plate 6 of the core is at a distance above the bottom of the pool, thus making it possible to take action on the upper internal equipment, e.g. by inserting a tool such as the tool 22 into any one of the guide tubes of the upper internal equipment, from beneath the upper plate 6 of the core which has openings (generally square-shaped openings) in register with each of the fuel assemblies, and in particular in register with each of the fuel assemblies in which clusters are moved for adjusting reactivity.

Tooling is moved beneath the upper internal equipment so as to be placed in any one of the guide tubes of the upper internal equipment by using a carriage 23 capable of moving on the bottom of the pool in two mutually perpendicular directions so as to be able to present tooling such as the tooling 22 vertically beneath any of the openings passing through the upper plate 6 of the core.

The apparatus 22 used for implementing the method of the invention of machining by electro-erosion comprises an outer case 24 of tubular shape having fixed on the outside surface thereof at three successive locations in the axial direction of the case 24, three sets 25 of four guide fins such as 25a, 25b, and 25c disposed in axial planes of the tubular case 24 of the tool 22 and at 90° intervals from one another. Depending on the number of zones to be machined along the continuous guidance length, the apparatus 22 may have an arbitrary number of sets of fins 20, for example two sets or more.

In order to perform machining by electro-erosion inside the continuous guide elements of a guide tube as shown in FIG. 7, the tool 22 is inserted in the axial direction 15 of the guide tube in which machining of the continuous guidance is to be performed and in a position that is coaxial with the guide tube, for example by using lifting means fixed to a handling hub 26 fixed to the top end of the case 24 of the tool 22.

The tool 22 can be moved inside the guide tube 8 so that its tubular case moves inside the central empty space of the guide tube, with the guide fins of the sets of fins 25 being inserted and moving within the continuous guide elements constituted by the sleeves 16 or radially inwards in register with the slots of the guide tubes 17.

The guide fins such as 25a, 25b, and 25c of a set of fins are thus disposed in such a manner as to be capable of being inserted simultaneously in four continuous guide sleeves 16 disposed at 90° about the axis 15 of the guide tube or internally in line with the slots of four split tubes 17 that may likewise be disposed at 90° relative to one another about the axis 15 of the guide tube.

In reality, it is necessary to use tools 22 of three different types.

One of the tools is used for machining the guide channels of the four guide sleeves 16 that are disposed at 90° relative to one another, the second tool is used for machining the guide channels of the other four sleeves of the guide tubes that are likewise disposed at 90° to one another, and the third tool is used for machining four split tubes 17 simultaneously. The radial distance between the guide channels to the axis of the guide tube differs between the first set of sleeves 16 at 90° to one another and the second set of sleeves 16. It is therefore not possible to use the same tool merely by turning it through 45° in order to machine successively the first set of sleeves and then the second set of sleeves of the guide tube. However, it is possible to use the same tube to machine successively a first set of four split tubes disposed at 90° from one another and then a second set of split tubes likewise disposed at 90° to one another.

It is also possible to envisage using a tool 22 having three sets of eight guide fins enabling machining to be performed simultaneously in eight split tubes of the guide tube.

Each of the guide fins such as 25a, 25b, and 25c serves, as explained below, to guide an electrode support on which there are fixed two electro-erosion electrodes for machining cylindrical enlargements in the continuous guide channels of a guide tube of the upper internal equipment.

When machining four guide sleeves, twenty-four machining operations are thus performed simultaneously inside eight guide channels of four guide sleeves in zones that are spaced apart along the axial length of the guide channels, by using twenty-four suitably-shaped electrodes.

The apparatus 22 of the invention also has means enabling the twenty-four electrodes for machining by electro-erosion to be advanced simultaneously towards the insides of the guide channels, i.e. towards the axis 15 of the guide tube.

The means used for causing the twenty-four electrodes for machining by electro-erosion (for a particular guide sleeve) to advance simultaneously comprise a command rod 27 disposed along the axis of the tubular case 24 of the tool 22 and movable along said axis to impart advance movement to the electrodes.

At its end situated at the bottom portion of the upper plate 6 of the core when the tool 22 is in its in-service position, the command rod 27 is connected to displacement means 28 such as an actuator mounted on a head 29 of the tool 22 secured to a support 30 on which there is fixed, at a through opening, the bottom end of the tubular case 24 of the tool 22.

As explained below with reference to FIG. 16, the command rod 27 has tubular segments which are connected to actuating cross-pieces 31, each interposed between two successive tubular segments of the command rod 27. Each of the three actuating cross-pieces 31 is disposed substantially in register with a set 25 of four guide fins so as to be able to actuate simultaneously four electrode carriers guided by the guide fins.

In FIG. 12, there can be seen a cross-piece 31 that is movable inside the tubular body 24 of the tool 22 so as to serve to advance simultaneously four electrode carriers mounted to move in the radial direction, inside an opening of a guide fin which is inserted into the central slot 16a of a guide sleeve 16.

The cross-piece 31 has four branches at 90° intervals for simultaneously actuating the electrode carriers mounted to move in the four fins at 90° intervals in a set of guide fins 25 of the tool 22.

Each of the branches of the cross-piece 31 is made in the form of a fork having a command shaft 32 mounted therein.

As can be seen in FIGS. 13 and 14, each electrode carrier 33 having substantially the shape of a plane plate has two mutually parallel branches 33a and 33b situated on either side of an opening 34 in which two electrodes 35 are fixed in parallel dispositions.

The electrode carrier 33 has means enabling the electrodes 35 to be installed and replaced after they have been in use for a certain length of time.

Mounted on each of its branches 33a and 33b, on the outside relative to the cavity 34, the electrode carrier 33 has respective slideways 36a and 36b made of an electrically-insulating material.

The slideways 33a and 33b are slidably mounted in respective guiding slideways 36a and 36b clamped to the frame 25 and situated on either side of the opening of the guide fin 25 in which the electrode carrier 33 is placed. The electrode carrier 33 is thus mounted to move radially in the corresponding fin 25, i.e. in the longitudinal direction of the central slot 16a of the sleeve 16 interconnecting the guide channels 16b and 16c of the sleeve 16 in which the guide fin 25 is inserted.

As can be seen in FIG. 13, the electrode support 33 includes a rectilinear opening 40 in an inner end portion in line with the branches 33a and 33b, which opening is slightly inclined relative to the common longitudinal axis of the command rod 27 and the tool 22. The slot 40 is of width substantially equal to the diameter of the actuator shaft 32 of one of the branches of the crosspiece 31. When the crosspiece 31 is moved in one direction or the other along the axis of the tool that is put into place coaxially inside the guide tube, the actuator shaft 32 gives rise to displacement of the electrode carrier 33 either inwardly, i.e. towards the longitudinal axis of the tool 22, or else outwardly, i.e. in the opposite direction.

For a slot 40 that is slightly inclined in an outward direction going upwards, as shown in FIGS. 13 and 16, moving the command rod 27 and the crosspieces 31 upwards causes the electrode carriers and the electrodes to move inwards. The guide channels are machined while the electrode carriers 33 and the electrode 35 are being moved inwards in this way.

As can be seen in FIG. 16, each of the cross-pieces 31 carries two sets of two piston-and-spring return systems 39, each serving to return the two electrode carriers that are disposed at 180° to each other in an outward direction when the command rod 27 and the cross-piece 31 is moved downwards.

Each of these return devices 39 comprises a helical spring 41 and two pistons 42 and 42' mounted to move in cavities machined in the cross-piece 31 in line with each other and each directed towards the end portion of an electrode carrier 33 so that the pistons 42 and 42' come into contact with the end portions of the electrode carriers 33 so as to return the electrode carriers outwards by applying thrust thereto.

In FIG. 17, there can be seen an electrode carrier 33 having two electrodes 35 mounted thereon for simultaneously machining enlargements defined by portions of a cylindrical surface inside two channels of a guide sleeve 16 of the upper internal equipment.

Each of the sets of fins 25 of a tool used for enlarging the guide channels of four guide sleeves 16 has means for guiding four electrode carriers which are actuated simultaneously by a cross-piece.

Re-machining a guide tube in order to restore the drop time of the control cluster guided inside the tube can thus be performed in a manner which is rapid and automatic.

Nevertheless, in order to re-machine a guide tube, it is necessary to make use of three different tools 22 in succession in order to act in both sets of sleeves 16 that are at 90° intervals, and in the split tubes 17.

The method of the invention thus enables the drop time of control clusters to be restored without dismantling and replacing the guide tubes of the upper internal equipment.

While the nuclear reactor is stopped, and after it has cooled down, the reactor pool is filled and the closure head is opened so as to be able to extract the upper internal equipment from the vessel and place it on the storage stand in the pool.

The shape and the dimensions of the guide channels, and in particular of the continuous guide channels, are then inspected in order to evaluate the wear of the channels and prepare for taking action by implementing the method of the invention. Apparatus is known that is suitable for use in the pool to inspect all of the guide channels of a guide tube forming part of the upper internal equipment.

After the upper internal equipment has been put into place on the storage stand at the bottom of the pool, inspection apparatus of conventional type is used to measure the shapes of the continuous guide channels of the guide tubes of the upper internal equipment. This determines whether it is necessary to implement the method of the invention, and also to determine which guide tubes of the upper internal equipment need to be dealt with in this way.

The amount of action that needs to be taken for enlarging the guide channels can thus be restricted to those guide tubes where such operations are necessary.

Thereafter, the tool-carrying elevator carriage is used which positions the support 30 against the upper plate 6 of the core, the carriage traveling on the bottom of the pool beneath the storage stand, and use is also made of a hoist for taking action from above the upper internal equipment for raising the machining apparatus inside each of the guide tubes.

The machining apparatus is thus put into place in succession in each of the guide tubes that is to be machined.

While machining by electro-erosion is being performed, the particles of metal detached by the sparking drop towards the lower portion of the upper internal equipment, passing through the upper plate of the core via the opening in which the tool 22 has been inserted.

As can be seen in FIG. 11, a debris-recovery box 43 including a gasket 44 for leaktight contact with the bottom face of the upper plate 6 can be fixed on the support 30 of the tool 22 so as to surround the opening through which it passes. The metal debris is recovered via a suction tube 45 operating at a high rate.

A small fraction of the debris falls inside the tubular body 24 of the tool 22 from which it is recovered by suction using a low rate suction duct 46.

FIG. 15 shows a variant embodiment of the means for recovering and filtering particles that are made by machining the guide tube 8 whose bottom portion is secured to the upper plate of the core from around the opening through which the tool for machining the inside of the guide tube by electro-erosion is made to penetrate.

This device comprises a recovery funnel 47 fixed in water-tight manner to the inside of the through opening in the upper plate 6 of the core. The recovery funnel 47 is connected to a filter circuit comprising a pump 48 and a filter 49. The water leaving the filter is eliminated, as represented by arrow 50.

The invention is not limited specifically to the embodiment described above.

Thus, operations of enlarging the continuous guide channels of guide tubes belonging to the upper internal equipment can be performed using machining methods that are different from machining by electro-erosion.

For example, it is possible to envisage using methods of electrochemical machining involving a lithium based electrolyte which is compatible with the additives used in the cooling water of the nuclear reactor. Nevertheless, it is not possible in general to implement an electrochemical method of machining on the upper internal equipment placed on the storage stand in the pool and that has not been dismantled.

In order to implement a method of enlarging the continuous guide channels of the guide tubes when using electrochemical machining, the bottom continuous guidance portions of the guide tubes are dismantled and said bottom portions of the guide tubes are placed in a fixture surrounding at least the top portion for continuous guidance. The fixture is placed so as to cover a vessel for electrochemical machining that is situated under water, in the pool, in the vicinity of the stand for storing the upper internal equipment. It is thus possible to perform electrochemical machining of the continuous guide channels of the guide tube. It is also possible to use the same technique for performing machining by electro-erosion of the continuous guide channels, after the guide tubes have been dismantled.

It is also possible to use other methods of machining such as mechanical machining, which can be implemented under water in the nuclear reactor pool.

It is also possible to use the same technique for enlarging the continuous guide channels as is already in use on new internal equipment, i.e. enlargement by hydraulic expansion.

Instead of performing enlargement in discontinuous zones defined by cylindrical surfaces that are not coaxial with the guide channels, such zones being referred to as "buckets", it is possible by machining or forming to make discontinuous enlargements that are annular and coaxial with the channels in the form of grooves or indeed enlargements that are continuous in the form of helical grooves inside said continuous guide channels of the guide tube.

It is possible simultaneously to enlarge a set of guide channels of a guide tube by machining or by forming in more than three zones of each channel along its length, or in only two zones. When using machining electrodes for electro-erosion, for example, it is possible to advance the electrode simultaneously while machining is taking place by simultaneously displacing the electrode carriers on which one or more electrodes are secured.

In general, internal enlargement of the continuous guide channels can be performed by any forming or machining method that enables the section available to the absorber rods inside the continuous guidance portions of the guide tubes to be enlarged.

Because the control clusters move inside the guide tubes of the upper internal equipment facing inlets for cooling water into the reactor vessel, some of the continuous guide channels of the guide tubes are subjected to wear towards the inside of the guide tube while other channels are subjected to wear towards the outside of the guide tube. Re-machining the insides of the continues guide channels nevertheless enables the drop time of such control clusters to be reduced by enlarging the passage available to the absorber rods in the guide channels.

The invention applies in general to any water-cooled nuclear reactor having clusters for adjusting the reactivity of the core of the nuclear reactor that can be inserted into a maximum insertion position within the reactor core by dropping under the effect of gravity through guide tubes that include continuous guide channels.

What is claimed is:

1. A method of restoring the drop time of at least one control cluster for adjusting the reactivity in the core of a light water cooled nuclear reactor, in which the core is constructed by juxtaposed fuel assemblies placed in a nucleaar reactor vessel with vertically disposed guide tubes for guiding absorber rods of control clusters, the reactor including upper internal equipment above the core and resting on the top portions of the fuel assemblies of the core via a top plate of the core extending in a horizontal disposition and including a set of vertical guide tubes each used for guiding a control cluster including by a bundle of mutually parallel absorber rods and including a plurality of mutually parallel guide channels, said method comprising: operating the reactor for a period of time, subsequently stopping the reactor and providing a cool down period, placing the upper internal equipment in a reactor pool, enlarging the guide channels of at least one guide tube, wherein the enlarging is performed in at least one zone of the continuous guide channels.

2. A method according to claim 1, wherein the step of enlarging is performed on the guide channels of at least one guide tube of the upper internal equipment of the reactor, on internal equipment in the non-dismantled state and placed on an examination and repair stand in the reactor pool.

3. A method according to claim 1 wherein the step of enlarging guide channels is accomplished by one of the following methods: machining by electro-erosion; mechanical machining; and hydraulic forming.

4. A method according to claim 1, including dismantling the guide tube from the upper internal equipment and performing the machining on the bottom, continuous guidance portion of the guide tube under water in a machining zone within the reactor pool.

5. A method according to claim 4, wherein the step of enlarging is performed by machining the continuous guide channels by one of the following methods: machining by electro-erosion; electrochemical machining; mechanical machining; and hydraulic forming.

6. A method according to claim 1 wherein the guide channels of the guide tube are enlarged discontinuously in the form of enlarged zones having cylindrical walls that are not coaxial with the guide channels and referred to as buckets.

7. A method according to claim 1 wherein the step of enlarging is performed by machining in discontinuous annular zones that are coaxial with the guide channels, in the form of grooves.

8. A method according to claim 1 wherein the step of enlarging of the guide channels is performed by machining at least one continuous helical groove in each continuous guide channel.

9. A method according to claim 6, wherein the step of enlarging includes making three enlargements within each of the continuous guide channels, the enlargements being spaced apart along the axial direction of the continuous guide channel.

10. A method according to claim 1 wherein the step of enlarging is performed simultaneously in a set of continuous guide channels of the guide tubes in at least two zones spaced apart along the length of each of the continuous guide channels.

* * * * *

UNITED STATES PATENT AND TRADEMARK OFFICE
CERTIFICATE OF CORRECTION

PATENT NO. : 6,865,242 B2
DATED : March 8, 2005
INVENTOR(S) : Gerard Barbe et al.

It is certified that error appears in the above-identified patent and that said Letters Patent is hereby corrected as shown below:

Title page,
Item [54], Title, please amend as follows
-- METHOD AND APPARATUS FOR RESTORING THE DROP TIME OF AT LEAST ONE CONTROL CLUSTER FOR ADJUSTING REACTIVITY IN THE CORE OF A NUCLEAR REATOR COOLED BY LIGHT WATER --

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,865,242 B2
DATED : March 8, 2005
INVENTOR(S) : Gerard Barbe et al.

It is certified that error appears in the above-identified patent and that said Letters Patent is hereby corrected as shown below:

<u>Title page,</u>
Item [54], Title, please amend as follows:
-- METHOD AND APPARATUS FOR RESTORING THE DROP TIME OF AT LEAST ONE CONTROL CLUSTER FOR ADJUSTING REACTIVITY IN THE CORE OF A NUCLEAR REACTOR COOLED BY LIGHT WATER --.

Signed and Sealed this

Sixth Day of September, 2005

JON W. DUDAS
*Director of the United States Patent and Trademark Office*